March 20, 1951          J. F. DUNN          2,545,846
TIME-CONTROLLED TEMPERATURE-RESPONSIVE OVEN CONTROL
Filed Feb. 1, 1947          2 Sheets-Sheet 1
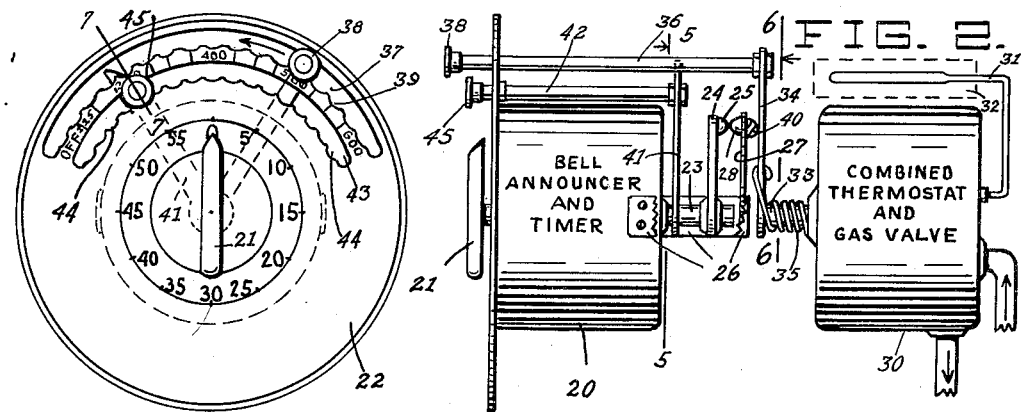
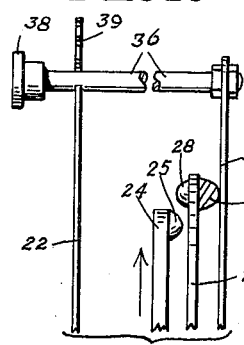
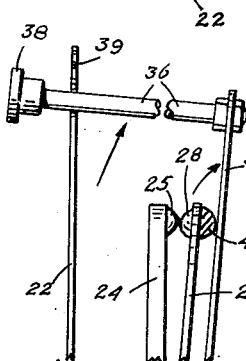
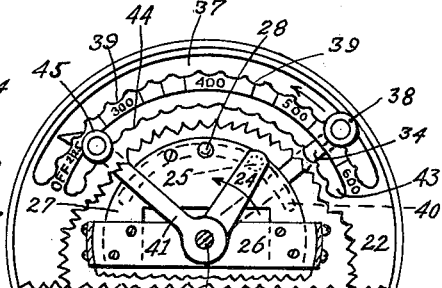
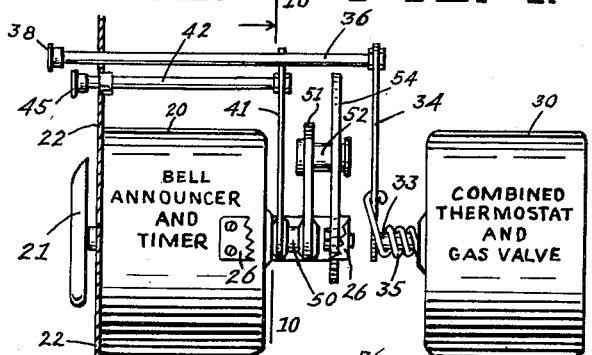
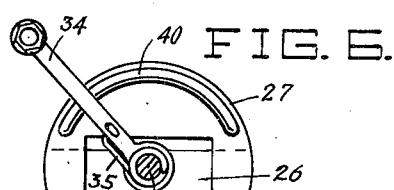
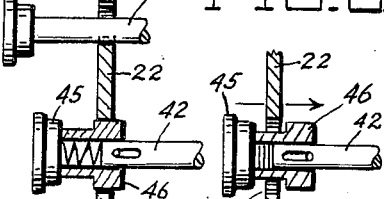
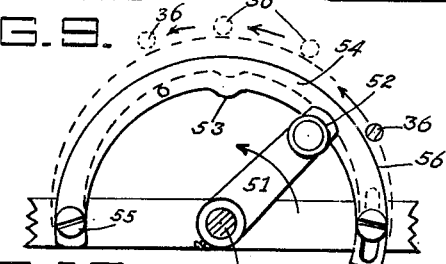
INVENTOR.
JOSEPH F. DUNN.
BY John M. Cole.
ATTORNEY.

March 20, 1951           J. F. DUNN           2,545,846
TIME-CONTROLLED TEMPERATURE-RESPONSIVE OVEN CONTROL
Filed Feb. 1, 1947           2 Sheets-Sheet 2
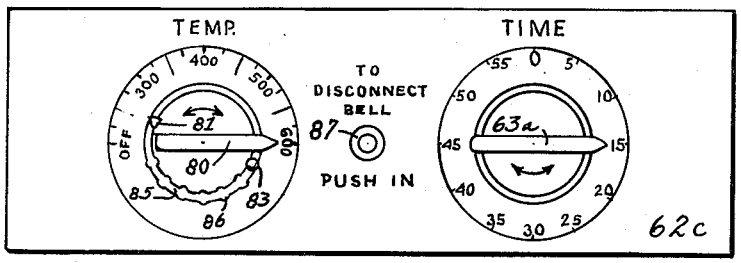
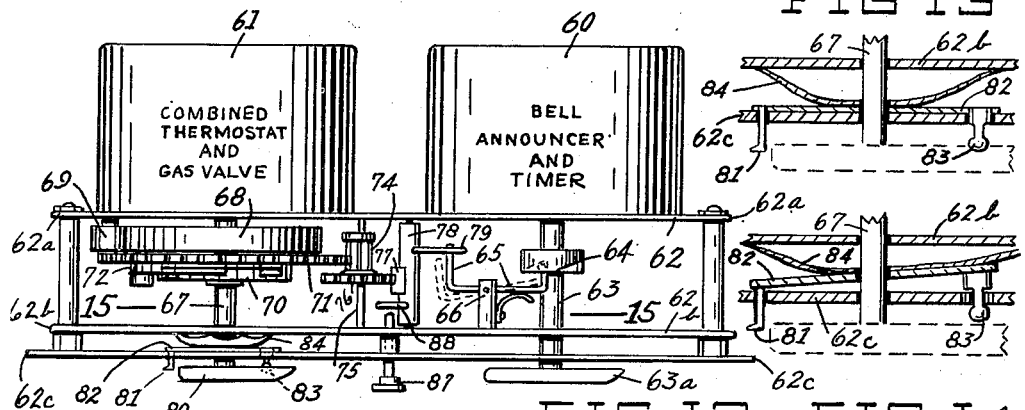
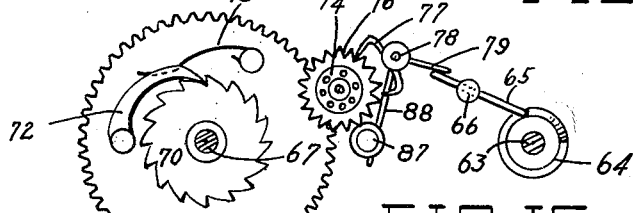
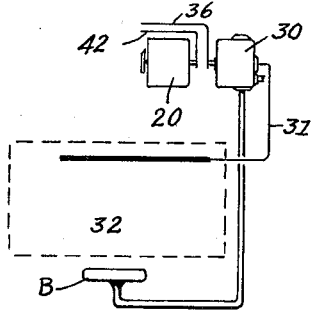
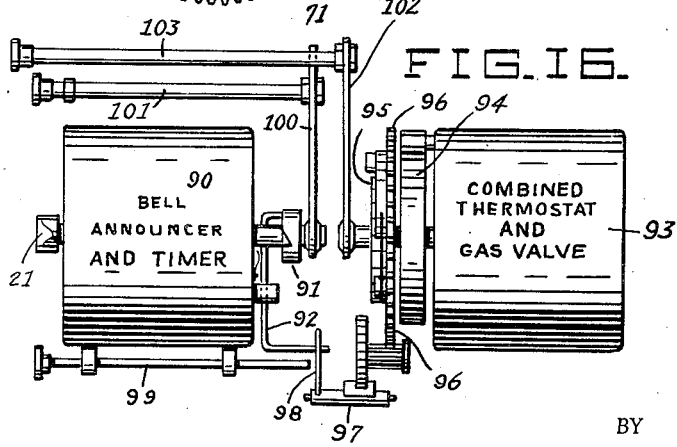
INVENTOR.
JOSEPH F. DUNN.
BY
John M. Cole
ATTORNEY.

Patented Mar. 20, 1951

2,545,846

UNITED STATES PATENT OFFICE 2,545,846

TIME-CONTROLLED TEMPERATURE-RESPONSIVE OVEN CONTROL

Joseph F. Dunn, New York, N. Y.

Application February 1, 1947, Serial No. 725,816

6 Claims. (Cl. 236—46)

1

The present invention relates to oven controls and is more particularly directed toward oven controls suitable for use with cooking ovens used in the preparation of food.

In certain cooking processes such, for example, as roasting meat and baking, it is desirable to have a compartively high preliminary oven temperature for the initial portion of the cooking period to be followed by a reduced oven temperature for continuation of the roasting or baking. To obtain such control of temperature it has been customary to manually vary the heat, as by changing the firing rate of the fuel used, or to set the oven thermostat for the desired high heat and later manually change the setting to a lower oven temperature. Such manual settings require the personal attention of the housewife.

The present invention contemplates improved control for the oven whereby the oven thermostat may have a preliminary high temperature setting which is held for a variably predetermined time after which the oven temperature is allowed to drop to another predetermined lower temperature at which it is held for continuation of the cooking process, or the fuel supply cut off completely.

Other and further objects will hereinafter appear as the description proceeds.

The accompanying drawings show, for purposes of illustrating the present invention, several embodiments in which the invention may take form, it being understood that the drawings are illustrative of the invention rather than limiting the same.

In these drawings:

Figure 1 is a face elevational view of one form of oven control in which all parts are arranged to operate around a single axis;

Figure 2 is a side elevational view of the control apparatus of Figure 1;

Figures 3 and 4 are fragmentary side elevational views of the control apparatus of Figures 1 and 2, Figure 3 showing certain parts in latched position and Figure 4 showing them in unlatched position;

Figure 5 is a fragmentary front elevational view with parts broken away on line 5 of Figure 2 to show interior construction;

Figure 6 is a fragmentary sectional view taken on the line 6—6 of Figure 2;

Figure 7 is a fragmentary sectional view taken on the line 7—7 of Figure 1 showing the low temperature setting in locked position;

Figure 8 is a fragmentary view of the structure of Figure 7 showing the unlocked position of the lower temperature setting;

Figure 9 is an elevational view similar to Figure 2 showing a modified form of construction;

Figure 10 is a fragmentary sectional view taken on the line 10—10 of Figure 9;

2

Figure 11 is a front elevational view of a construction in which the temperature control and time control are arranged side by side;

Figure 12 is a top plan view of the construction of Figure 11;

Figure 13 is a fragmentary horizontal sectional view at a larger scale than Figure 12 showing the low temperature setting in locked position;

Figure 14 is a view similar to Figure 13 showing the low temperature setting in unlocked position;

Figure 15 is a sectional view on the line 15—15 of Figure 12;

Figure 16 is a side elevational view of a further modified form of construction in which the temperature and time control are in axial alignment; and Figure 17 is a diagrammatic view illustrating an installation in a cooking range.

The construction shown in Figures 1 to 8 inclusive, employs a bell announcer and timer 20 which in general is of conventional form and has the usual windup spring adapted to be wound by an exposed control knob or handle 21 disposed in front of a face plate 22. The face plate carries numerals such as indicated showing the lapse of time necessary for the unwinding of the clock spring. The announcer and timer unit 20 has a rearwardly extending shaft 23 which carries an arm 24 adapted to travel with the shaft. This arm has a rearwardly extending button 25. The rear of the unit 20 is provided with a frame 26 on which is mounted a thin metal plate 27 adapted to be bent rearwardly when the button 25 on the arm 24 engages a forwardly extending button 28 as indicated more clearly in Figures 3 and 4. The buttons 25 and 28 engage at the time when the windup spring for the bell announcer and timer has unwound and brought this mechanism back to the zero time position. As a result of the engagement of the buttons 25 and 28 the flexible plate 27 is shifted rearwardly from the position of Figure 3 to the position of Figure 4.

Directly behind the bell announcer and timer unit is a combined thermostat and gas valve unit indicated at 30. This unit is of conventional construction in so far as it relates to the gas valve and the thermal control for the gas valve for controlling flow of fuel to a burner B (Fig. 17). The thermal control or thermostat has a bulb 31 in an oven 32. The usual shaft 33 extends forwardly from the thermostat and by this shaft it is possible in the usual manner to adjust the thermostat for various oven temperatures.

Instead of providing the common control knob at the front of the thermostat, the construction in Figures 1 to 8 inclusive contemplates that shaft 33 will carry an arm 34 rigid in axial directions so that it can be used to adjust the thermostat but flexible in directions parallel with the axis so that it can be bent from the position indicated in Figure 3 to the position indicated in Figure 4. The coiled spring 35 biases the shaft 33 in a counterclockwise direction so as to move the shaft toward a lower temperature setting whenever the shaft is free of restraint.

In the construction shown in these Figures 1–8, the arm 34 is provided with a forwardly extending rod 36 which passes through an arcuate slot 37 in the face plate 22. The front end carries a knob 38. The arcuate slot 37 has a number of notches 39 opposite corresponding temperature markings of from 225° to 600°. The resilient arm 34 urges the rod 36 toward the shaft axis so as to hold the rod 36 in the desired notch 39 whereby a setting may readily be made of the temperature at which it is desired to operate the oven. This setting will be held so long as the arm 34 is not bent rearwardly.

The rear face of the bendable member 27 carried by the front unit is provided with an arcuate cam-like element 40 of sufficient angular extent to be opposite the arm 34 in all settings which this arm can take. When the clock announcer unwinds to bring the button 25 opposite the button 28, the plate 27 is bent rearwardly and the cam-like element 40 is brought against the arm 34 bending it as indicated in Figure 4 and releasing the rod 36 from the notch 39 in which it had previously been held. This will cause the spring 35 to shift the thermostat setting from the high temperature toward a low temperature.

The extent to which the spring 35 can move the thermostat setting arm is determined by an adjustable stop arm 41 pivotally carried on the shaft 23 and in the path of the rod 36. The arm 41 carries a forwardly extending rod 42 which extends through an arcuate slot 43 in the face plate 22. This slot is provided with notches 44 corresponding with the notches of slot 37. The front end of the rod 42 carries a spring controlled plunger or knob 45 which is normally held in the forward position shown in Figure 7 in which the enlarged inner end 46 of the knob enters the selected notch 44 in the face plate. When however, the knob is pushed in as indicated in Figure 8 the enlarged portion 46 is behind the face plate so that the rod 42 can be shifted back and forth in the arcuate slot 43.

The mechanism just described provides a low temperature setting for the thermostat and a stop against which the thermostat arm is brought by the biasing spring 35 so that when the bell announcer and timer run down, the adjustment of the oven thermostat is automatically changed from the selected high temperature setting to the predetermined low temperature setting, after which the oven continues to operate at the low temperature.

Oven thermostats are commonly designed so that when the knob is turned below 225°, the gas is completely shut off. By shifting the rod 42 to the left end of the slot 43, the thermostat control rod 36 shifts beyond the 225° setting and the gas is shut off.

It will be apparent that one can use the timer and bell announcer whenever desired to give time signals and that the thermostat can be used to manually control oven temperatures independent of the timing control. All that is necessary is to manually change the temperature settings or wind the announcer as desired.

In the arrangement shown in Figures 9 and 10 the announcer and timer 20 and the thermostat and gas valve 30 are substantially the same as previously described. In this construction the shaft 50 of the combined bell announcer and timer carries an arm 51 provided with a roller 52 adapted to engage a cam element 53 carried on a member 54 pivoted at 55. The outer surface 56 of the member 54, when this member is in full line position, is concentric with the axis of the shaft 50 and is just inside the path of the rod 36 when it is in any of the preset positions. When the roller strikes the cam 53 it lifts the semi-circular arm or member 54 to the dotted line position of Figure 10 bringing it against the rod 36 no matter in what setting this rod had been placed and pushes the rod away from the axis of the shaft 50 so that it is lifted out of the notch 39 in a manner similar to that previously described. The other mechanism of Figures 9 and 10 may be the same as that above described in detail.

In the arrangement shown in Figures 11 and 12 the combined bell announcer and timer 60 and the combined thermostat and gas valve 61 are carried side by side and rearwardly of a frame 62 having plates 62a, 62b, 62c. The winding shaft 63 of the bell announcer extends through the plate 62c and carries an operating handle 63a. The shaft 63 also carries a cam 64 adapted to operate at a lever 65 pivoted at 66. The cam and lever are so related that the lever is held in full line position when the announcer is wound and the lever drops off the shoulder and into a slot of the cam when the timer has run down. The corresponding position of the lever 65 is indicated in dotted lines.

The shaft 67 of the thermostat and gas valve is secured to the inner end of a coiled spring 68, as is customary in clock mechanism, and the outer end of this spring is anchored as indicated at 69. The shaft 67 fixedly carries a ratchet wheel 70. Between the ratchet wheel 70 and the spring, the shaft 67 loosely carries a gear 71. This gear carries a pawl 72 urged against the ratchet wheel 70 by a spring 73. The gear 71 meshes with a lantern wheel 74 carried on a shaft 75. This wheel 74 carries a star wheel 76 which cooperates with a pallet 77 carried on a shaft 78 mounted between plates 62a and 62b. The pallet has an arm 79 adapted to be locked against movement by the lever 65 and to be released when the lever 65 is shifted to the dotted line position which occurs when the announcer runs down.

The extent to which the control handle 80 for the thermostat and gas valve is turned determines the amount to which the spring 68 is wound and the automatic locking of this shaft by the escapement mechanism makes it possible to hold the thermostat at the corresponding setting. Release of the escapement mechanism causes the spring 68 to unwind, thereby shifting the thermostat back toward the lower setting. The extent to which it can move is determined by a stop 81. This stop is carried on a disk 82 to the rear of plate 62c and can be adjusted by a button 83. The disk 82 is urged outwardly by a spring 84. The push button 83 extends through a slot 85 in plate 62c, the slot having notches 86 by which it is possible to lock the button 83 in any selected position so that the stop 81 is locked at the temperature setting at which it is desired to allow the operations to continue after the timer has released the thermostatic valve. If the stop 81 is brought down to the "off" position, the fuel is turned off.

Should one desire to operate the oven control independently of the timer control, the escapement mechanism may be locked against movement by a push button indicated at 87. Pushing this button in brings it against an arm 88 carried by the pallet and locks the pallet against oscillation. When the escapement mechanism is thus locked in position, the oven will run at the set temperature until the button 87 is withdrawn so that the escapement mechanism can then allow the fuel valve to close.

In the modification shown in Figure 16 the bell announcer and timer 90 carries a cam 91 similar to the cam 64 and this cam cooperates with a lever 92 similar to the lever 65. The combined thermostat and gas valve 93 carries spring 94, ratchet wheel 95, gear wheel 96, similar to that shown and described above. The gear wheel 96 operates an escapement mechanism diagrammatically illustrated at 97 and having an arm 98 adapted to be engaged by the cam control lever 92 or by a manually operable rod 99. The lever 92 acts to lock the escapement mechanism against operation until released by the clock and the rod 99 is adapted to lock the escapement mechanism against operation until manually released. In this construction the manual setting of the low temperature is accomplished by an arm 100 and rod 101 similar to the arm 41 and rod 42 of Figure 2. The adjustment of the thermostat and gas valve is accomplished by an arm 102 and rod 103, similar to the corresponding parts shown in Figure 2. The construction of Figure 16 would employ a face plate similar to that shown in Figure 1, but without notches in the outer arcuate slot.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. As an article of manufacture for use with a cook stove having an oven and oven heater to control the successive stages of the cooking operation according to a preselected cycle; comprising: an oven temperature responsive control mechanism connected to the oven heater to control the supply of heating energy thereto and including a spring biasing the control mechanism toward a lower temperature and an external, manually accessible temperature presetting member for setting the control mechanism to a selected high temperature for the initial cooking stage and having means to retain the mechanism in a position to maintain the spring biased; a spring-motor-operated timer settable on winding to require a predetermined lapse of time to run down and including an external, manually accessible winding member adjacent the temperature presetting member, an escapement mechanism and a releaser for the biasing spring retaining means; a stop member against which the biasing spring upon release of the temperature presetting member brings the temperature presetting member and an externally accessible stop presetting member adjacent the first and second manually accessible members for positioning the stop in a selected position corresponding to a lower oven temperature than the one first selected, whereby upon timer release of the control mechanism the latter is shifted by its biasing spring to the selected lower temperature position so that cooking proceeds through a second cooking stage at the selected lower temperature.

2. An article of manufacture such as claimed in claim 1 wherein the oven temperature control mechanism has a shaft adjustable axially about its axis, and the timer has a shaft turned about its axis when being wound up and when unwinding.

3. An article of manufacture such as claimed in claim 1 wherein the oven temperature control mechanism has a shaft adjustable axially about its axis, and the retaining mechanism includes a ratchet wheel carried by the said shaft, a gear wheel carried by the shaft and carrying a spring controlled pawl engageable with the ratchet wheel to drivingly interconnect the gear and shaft, an escapement mechanism drivingly connected with the gear wheel, and escapement mechanism locking means preventing unwinding of the energy storing spring, and wherein the timer has a winding shaft turned about its axis when being wound up and when unwinding, and the winding shaft carries a cam, and having a cam follower for effecting release of the gear-wheel-driven escapement-mechanism when the timing mechanism is run down.

4. An article of manufacture as is claimed in claim 3 wherein the shafts are parallel with one another.

5. An article of manufacture such as claimed in claim 1 wherein the oven temperature control mechanism has a shaft adjustable axially about its axis, and the retaining mechanism includes a ratchet wheel carried by the said shaft, a gear wheel carried by the shaft and carrying a spring controlled pawl engageable with the ratchet wheel to drivingly interconnect the gear and shaft, an escapement mechanism drivingly connected with the gear wheel, and escapement mechanism locking means preventing unwinding of the energy storing spring, and wherein the timer is behind the oven temperature control mechanism and has a coaxial winding shaft turned about its axis when being wound up and when unwinding, and the winding shaft carries a cam, and having a cam follower for effecting release of the gear-wheel-driven escapement-mechanism when the timing mechanism is run down, and wherein the presettable means includes a member extending forwardly past the second unit.

6. An article of manufacture such as claimed in claim 1 wherein the oven temperature control mechanism has a rockable shaft which carries the temperature presetting member and timer includes a winding shaft aligned with the first shaft.

JOSEPH F. DUNN.

REFERENCES CITED

The following references are of record in the file of this patent:

UNITED STATES PATENTS

| Number | Name | Date |
| --- | --- | --- |
| 1,602,260 | Hicks | Oct. 5, 1926 |
| 1,609,432 | Scott | Dec. 7, 1926 |
| 1,681,640 | Hapgood | Aug. 21, 1928 |
| 1,719,991 | Newsom | July 9, 1929 |
| 2,054,041 | Persons | Sept. 8, 1936 |
| 2,262,962 | Pierson | Nov. 18, 1941 |
| 2,324,164 | Kronmiller | July 13, 1943 |